(No Model.)

C. S. RUCKSTUHL.
FEVER THERMOMETER.

No. 594,840. Patented Nov. 30, 1897.

Attest:
James J. O'Donohoe
Frank H. Haskins

Inventor:
Chas. S. Ruckstuhl
by Carr & Carr,
Attys.

UNITED STATES PATENT OFFICE.

CHARLES S. RUCKSTUHL, OF ST. LOUIS, MISSOURI.

FEVER-THERMOMETER.

SPECIFICATION forming part of Letters Patent No. 594,840, dated November 30, 1897.

Application filed July 13, 1896. Serial No. 598,959. (No model.)

*To all whom it may concern:*

Be it known that I, CHARLES S. RUCKSTUHL, a citizen of the United States, and a resident of the city of St. Louis and State of Missouri, have invented a new and useful Improvement in Fever-Thermometers, of which the following is a specification.

My invention relates to fever-thermometers, and has for its object to facilitate the reading thereof.

It consists in arranging streaks of low reflecting power on the surface of the thermometer close alongside of the cylindrical edge lens to indicate the direction of vision and to render the mercury column more distinct by contrast with such streaks and by avoiding the confusion arising from surface reflection.

Figure 1:
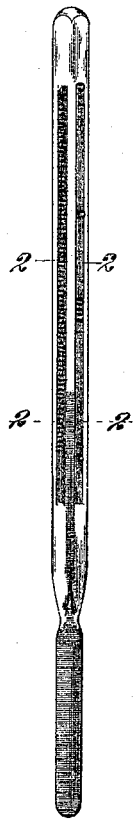
Figure 2:

In the accompanying drawings, which form part of this specification, Figure 1 is a front view of a fever-thermometer provided with my invention, and Fig. 2 is a cross-sectional view thereof.

Fever-thermometers are made of glass tubes of such small caliber that special devices are required to enable one to read the indications thereof. One of such devices consists in making the tube in the form of a triangular prism, one side of which is made of or contains a white opaque substance, and the edge opposite this side is rounded to constitute a cylindrical lens focusing on the thread of mercury. When this rounded edge is exactly in the line between the mercury and the eye, the direct ray from the thread of mercury emerges from the tube at right angles to its surface and therefore without deflection; but the rays from the mercury which strike the surfaces of the prism, or rather the cylindrical lens portion thereof, are refracted as they emerge from the glass into the air, the deflection being toward the direct line. The mercurial thread is thus seen simultaneously by means of the direct undeflected ray and by the other rays emerging from the lens portion. The combined effect of these several rays, each of which shows the image of the mercury in a different position overlapping the image of the next adjacent rays, is apparently to magnify the width of the mercury thread. When the width of this thread is thus magnified, its height can be readily observed and the reading of the thermometer ascertained.

The disadvantage of this device is that it requires to be held in one precise position, a very slight deviation from which renders the device useless. The result is that in the hands of inexperienced persons the device frequently fails entirely in its object, and even in the hands of experienced users it is liable to cause annoyance, because every time it is used the tube has to be shifted to and fro to ascertain experimentally the precise line of vision. The strong reflection of light-rays from the surfaces of the prism is liable to be very confusing in this operation, especially to inexperienced users.

My invention utilizes the structural arrangement above described as the basis of improvement. On each side of the rounded edge is arranged a streak or line of some color against which the mercury will show clearly. These lines or streaks 2 may be made by painting the surfaces of the prism with narrow streaks of a material whose reflecting power is low. The streaks are made narrow enough not to intercept in an excessive degree the light-rays necessary to illuminate the mercury. The only position in which the mercury thread appears magnified is between the streaks or lines thus formed on each side of the rounded edge. These streaks should bound closely on the magnifying-field of the edge lens and be as close together as is practicable to obtain the full magnifying effect. They thus indicate within a small angle the line of sight for the mercury thread and by the contrast of colors or by their unreflecting surfaces facilitate the reading of the thermometric indication.

While my device is primarily designed for fever-thermometers, it is obviously applicable to other similar apparatus, and I do not wish to be limited to its use in connection with such thermometers.

What I claim as new, and desire to secure by Letters Patent, is—

A prismatic thermometer having one edge formed into a cylindrical lens adapted to magnify the image of the thread of mercury, and having narrow colored streaks of low reflecting power on its surface alongside of the edge lens for indicating the place to look for the magnified image of the mercury thread and for rendering such image more easily visible, said streaks being narrow so as not to intercept the mercury-illuminating light-rays excessively, substantially as set forth.

CHAS. S. RUCKSTUHL.

Witnesses:
JAMES J. O'DONOHOE,
JAMES A. CARR.